(12) United States Patent
Galushka et al.

(10) Patent No.: US 9,232,011 B2
(45) Date of Patent: Jan. 5, 2016

(54) TRACKING NAVIGATION FLOWS WITHIN THE SAME BROWSER TAB

(75) Inventors: Nataliya Galushka, Seattle, WA (US); Ryan D. Parsell, Langley, WA (US); Asif A. Siddiqi, Bothell, WA (US); Mathanram Vettivelu, Kirkland, WA (US); Jonathan Q. King, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 12/748,093

(22) Filed: Mar. 26, 2010

(65) Prior Publication Data

US 2011/0239138 A1   Sep. 29, 2011

(51) Int. Cl.
*H04L 29/08* (2006.01)
*G06F 17/30* (2006.01)

(52) U.S. Cl.
CPC ............ *H04L 67/22* (2013.01); *G06F 17/3089* (2013.01); *H04L 67/02* (2013.01)

(58) Field of Classification Search
CPC ...... H04L 67/22; H04L 67/02; G06F 17/3089
USPC ........................................................ 715/707
See application file for complete search history.

(56) References Cited

U.S. PATENT DOCUMENTS

| | | | |
|---|---|---|---|
| 7,444,410 B1 * | 10/2008 | Hichwa et al. | 709/228 |
| 7,552,210 B1 * | 6/2009 | Blum et al. | 709/223 |
| 7,596,760 B2 | 9/2009 | Sauve et al. | |
| 7,673,233 B2 | 3/2010 | Moore et al. | |
| 8,200,833 B1 * | 6/2012 | Lau | 709/228 |
| 2004/0133563 A1 | 7/2004 | Harvey et al. | |
| 2004/0193699 A1 * | 9/2004 | Heymann et al. | 709/218 |
| 2006/0230058 A1 | 10/2006 | Morris | |
| 2006/0271861 A1 | 11/2006 | Yolleck et al. | |
| 2007/0067733 A1 * | 3/2007 | Moore et al. | 715/777 |
| 2007/0083813 A1 * | 4/2007 | Lui et al. | 715/709 |
| 2007/0255821 A1 * | 11/2007 | Ge et al. | 709/224 |
| 2007/0271382 A1 * | 11/2007 | Douiri et al. | 709/227 |

(Continued)

FOREIGN PATENT DOCUMENTS

| | | |
|---|---|---|
| CN | 101553769 | 10/2009 |
| KR | 100845336 | 7/2008 |

OTHER PUBLICATIONS

Burby, Jason, "Web Analytics: The Results of Tabbed Browsing", Retrieved at<<http://www.clickz.com/3623280>>, Aug. 29, 2006, pp. 2.

(Continued)

*Primary Examiner* — Ryan Pitaro
(74) *Attorney, Agent, or Firm* — Bryan Webster; Judy Yee; Micky Minhas

(57) ABSTRACT

Various embodiments enable navigation flows that occur within a single tab to be tracked through the use of identifiers that are created and passed between client-side and server-side software. The client-side and server-side software work in concert to utilize these identifiers to track navigation within a particular tab. In at least some embodiments, a client can request a web page from within a tab and, responsive to that request, a server can create an identifier and associate the identifier with the web page. The web page and identifier can then be returned to the client. Subsequent web page requests from within the tab include the identifier so that the server knows that the request came from the same tab.

20 Claims, 6 Drawing Sheets

(56) References Cited

U.S. PATENT DOCUMENTS

| | | | |
|---|---|---|---|
| 2009/0100438 A1* | 4/2009 | Hinton et al. | 719/311 |
| 2009/0287824 A1* | 11/2009 | Fisher et al. | 709/226 |
| 2010/0070928 A1 | 3/2010 | Goodger et al. | |
| 2010/0162104 A1* | 6/2010 | Acker et al. | 715/273 |
| 2010/0234018 A1* | 9/2010 | Lawler et al. | 455/426.1 |
| 2010/0275024 A1* | 10/2010 | Abdulhayoglu | 713/175 |
| 2011/0055912 A1* | 3/2011 | Fusari et al. | 726/8 |
| 2011/0072386 A1* | 3/2011 | Fisher et al. | 715/777 |
| 2011/0202678 A1* | 8/2011 | LaVoie et al. | 709/238 |
| 2011/0247045 A1* | 10/2011 | Rajagopal et al. | 726/1 |
| 2012/0016836 A1* | 1/2012 | Fender et al. | 707/603 |
| 2012/0185588 A1* | 7/2012 | Error | 709/224 |
| 2012/0324060 A1* | 12/2012 | Afergan et al. | 709/219 |

OTHER PUBLICATIONS

Stiles, Adam, "Tabbed Browser DNA", Retrieved at<<http://adamstiles.com/2005/02/tabbed_browser_/>>, Feb. 11, 2005, pp. 5.

"Apache MyFaces", Retrieved at << http://myfaces.apache.org/orchestra/myfaces-orchestra-core/multiwindow.html>>, Dec. 18, 2009, pp. 3.

"Wiki: Features of the Opera Web Browser (1/2)", Retrieved at << http://wapedia.mobi/en/Features_of_the_Opera_web_browser>>, Feb. 1, 2010, pp. 8.

"E8 and Loosely-Coupled IE (LCIE)", Retrieved at<<http://blogs.msdn.com/ie/archive/2008/03/11/ie8-and-loosely-coupled-ie-lcie.aspx>>, Feb. 1, 2010, pp. 13.

"Full Google Chrome Review—Technical and Usability Aspects. Crash Control, Multi process Design", Retrieved at<<http://www.affiliateplugin.com/Latest/full-google-chrome-review-technical-and-usability-aspects-crash-control-multi-process-design.html>>, Feb. 1, 2010, pp. 3.

"Foreign Office Action", CN Application No. 201180016243.9, Jul. 2, 2014, 17 Pages.

"International Search Report and Written Opinion", Application No. PCT/US2011/029748, Dec. 26, 2011, 6 pages.

"EP Search Report", European Application No. 11760194.8, (Jul. 24, 2013), 8 Pages.

Viermetz, Maximilian et al., "Relevance and Impact of Tabbed Browsing Behavior on Web Usage Mining", *Proceedings of the IEEE/ WIC/ ACM International Conference on Web Intelligence IEEE Comput*, SOC LOS Alamitos, CA, (Dec. 1, 2006), 8 Pages.

"Principle Analysis and Countermeasure Study on CSRF Attack", China Academic Journal Electronic Publishing House, 2009, 3 pages.

"Foreign Office Action", CN Application No. 201180016243.9, Mar. 9, 2015, 9 pages.

"Foreign Notice of Allowance", CN Application No. 201180016243.9, Jul. 2, 2015, 4 Pages.

\* cited by examiner

TRACKING NAVIGATION FLOWS WITHIN THE SAME BROWSER TAB

BACKGROUND

Many web browsers allow users to have multiple pages open at the same time under different tabs. The different tabs in the browser typically share the same browser session and session cookies. Because all of the tabs share the same browser session, when a user opens a page in a new tab, the new page is already conveniently logged in with the server for that user.

The nature of the tabbed browsing design has, however, created a complication insofar as tracking navigation flows that occur within individual browser tabs. Specifically, multiple tabs in the same browser typically share the browser session so when a request is generated and sent to a server, there is no indication of the tab from which the request originated. In many instances it can be useful to track a user's navigation within a particular domain or website. This can be useful to help domain or website owners understand how users interact with their site. For example, understanding a user's navigation activities can help facilitate marketing or advertising decisions associated with a particular site.

Typically, navigation data can be recorded and correlated regarding a user's activities with respect to a particular browser session. However, as noted above, when a user has multiple tabs open in a browser, because the tabs share the same browser session and session cookies, tracking navigation flows with respect to a single tab cannot be performed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable navigation flows that occur within a single tab to be tracked. Client-side and server-side software work in concert to utilize identifiers that are used to track navigation within a particular tab.

In at least some embodiments, a client can request a web page from within a tab and, responsive to that request, a server can create an identifier and associate the identifier with the web page. The web page and identifier can then be returned to the client. Subsequent web page requests from within the tab include the identifier so that the server knows that the request came from the same tab. If a user opens a new tab and makes a web page request, the client-side browser will not include the identifier associated with the other tab. Rather, no identifier will be included in the web page request and, responsively, the server will issue a new identifier so that navigation activities associated with the new tab can be tracked as well.

BRIEF DESCRIPTION OF THE DRAWINGS

The same numbers are used throughout the drawings to reference like features.

DETAILED DESCRIPTION

Overview

Various embodiments enable navigation flows that occur within a single tab to be tracked. Client-side and server-side software work in concert to utilize identifiers that are used to track navigation within a particular tab.

In at least some embodiments, a client can request a web page from within a tab and, responsive to that request, a server can create an identifier and associate the identifier with the web page. The web page and identifier can then be returned to the client. Subsequent web page requests from within the tab include the identifier so that the server knows that the request came from the same tab. If a user opens a new tab and makes a web page request, the client-side browser will not include the identifier associated with the other tab. Rather, no identifier will be included in the web page request and, responsively, the server will issue a new identifier so that navigation activities associated with the new tab can be tracked as well.

In the discussion that follows, a section entitled "Operating Environment" is provided and describes an environment in which one or more embodiments can be employed. Following this, a section entitled "Tracking Navigation Flows" describes how navigation flows can be tracked for a single tab in accordance with one or more embodiments. Next, a section entitled "Implementation Example" describes an example implementation in accordance with one or more embodiments. Last, a section entitled "Example System" describes an example system that can be utilized to implement one or more embodiments.

Operating Environment

Figure 1:
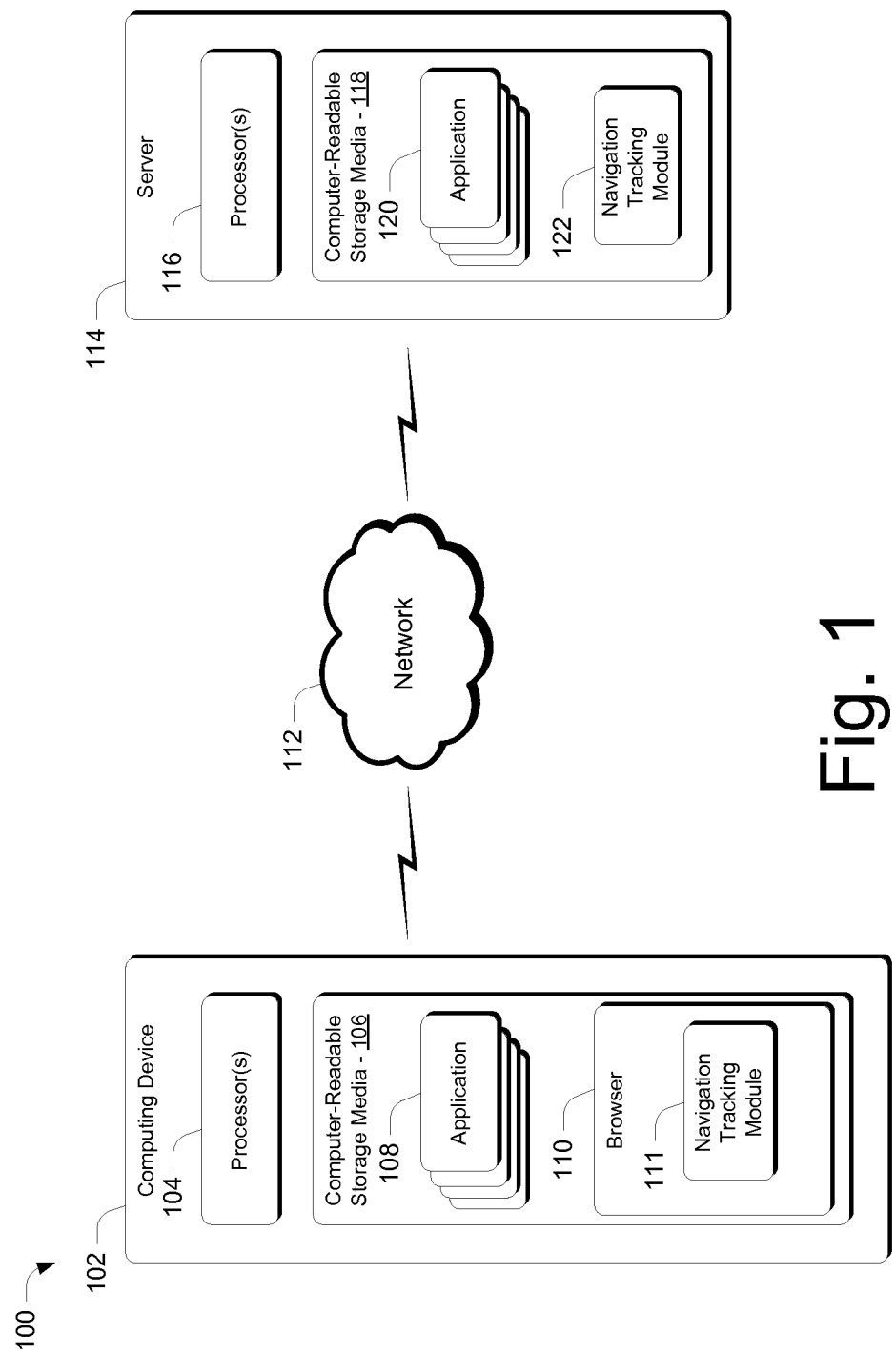
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes a software application in the form of a web browser 110. Any suitable web browser can be used examples of which are available from the assignee of this document and others. In addition, computer-readable storage media 106 can include a navigation tracking module 111 that operates as described above and below. Navigation tracking module 111 can be implemented as a standalone component that can be utilized by browser 110. Alternately or additionally, the navigation tracking module 111 can be implemented as part of browser 110, as illustrated here.

In addition, environment 100 includes a network 112, such as the Internet, and one or more servers 114 from and to which content can be received and sent. Server 114 includes one or more processors 116, one or more computer-readable storage media 118 and one or more applications 120 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device that can implement a server is shown and described below in FIG. 6.

In addition, server 114 also includes a navigation tracking module 122 that operates as described above and below. Navigation tracking module 122 can be implemented as a standalone component or one that is integrated with other applications.

In operation, browser 110 can request a web page from within a tab and, responsive to that request, server 114 can create an identifier via navigation tracking module 122, and associate the identifier with the web page. The web page and identifier can then be returned to the client or browser 110. Subsequent web page requests from within the tab include the identifier so that the server knows that the request came from the same tab. If a user opens a new tab and makes a web page request, the browser 110 will not include the identifier associated with the other tab. Rather, no identifier will be included in the web page request and, responsively, the server 114 will issue a new identifier so that navigation activities associated with the new tab can be tracked as well.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of how navigation flows can be tracked in accordance with one or more embodiments.

Tracking Navigation Flows

Figure 2:
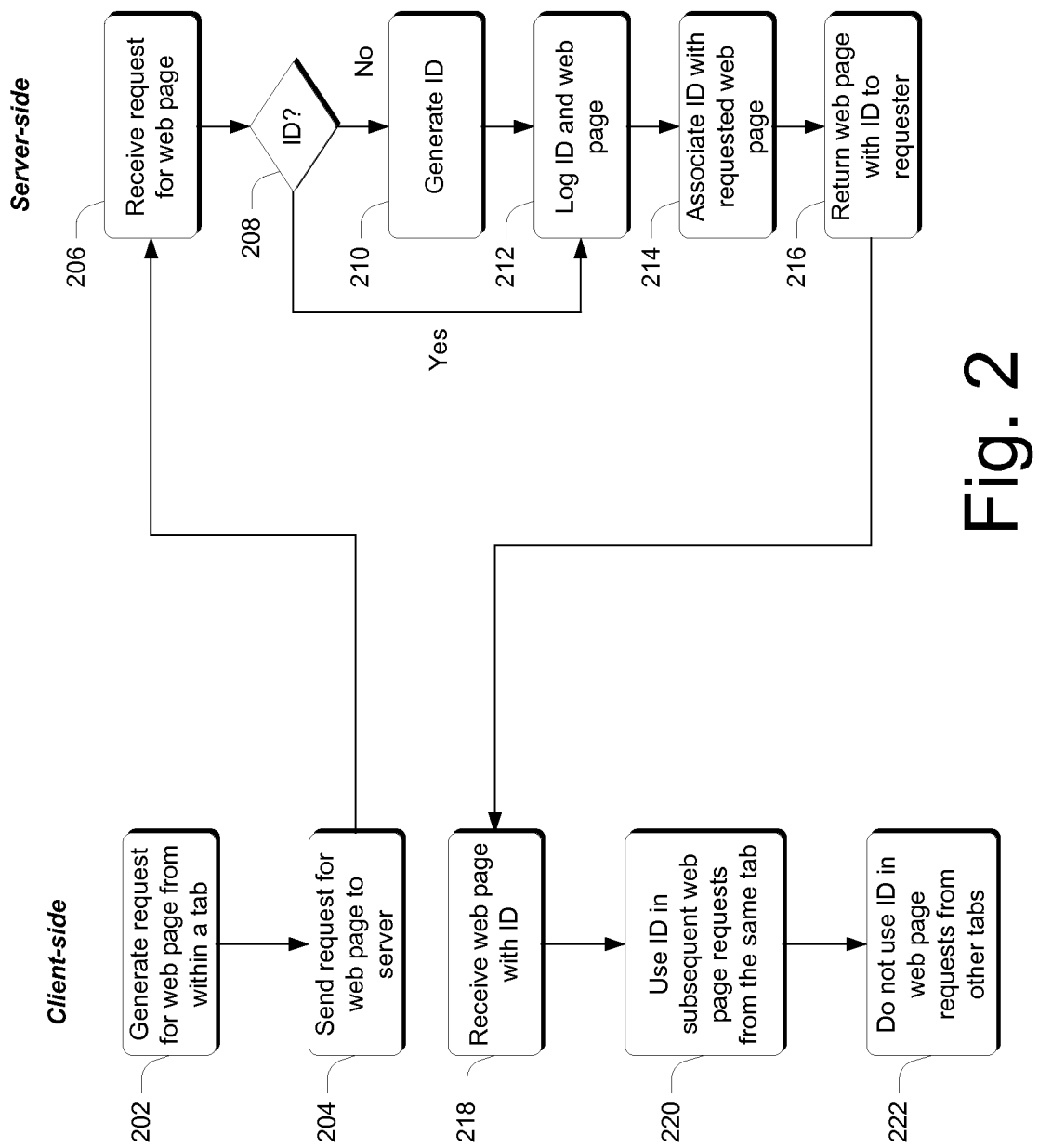
FIG. 2 is a flow diagram that describes steps a method in accordance with one or more embodiments.

FIG. 2 is a flow diagram that describes steps in a method in accordance with one or more embodiments. The method can be performed in connection with any suitable hardware, software, firmware, or combination thereof. In the FIG. 2 diagram, certain steps are designated as being performed on the "client-side," and certain steps are designated as being performed on the "server-side." In at least some embodiments, the described steps can be performed by software modules, such as navigation tracking modules 111, 122 respectively.

Step 202 generates a request for a web page from within a tab. This step can be performed by a suitably-configured Web browser application. Step 204 sends the request for the web page to a server. This step can be performed by sending the request over a network, such as the Internet.

Step 206 receives, at the server, the request for the web page. Step 208 ascertains, from the request, whether an identifier is associated with the request. The identifier can be associated with the request in any suitable way. For example, in at least some embodiments the identifier can be included with a query string that forms part of the request. Alternately, the identifier can be included with a cookie that is sent along with the request. If the request does not contain an identifier, then step 210 generates an identifier and step 212 logs the identifier and the web page in a log file. Any suitable type of identifier can be used. In at least some embodiments, the identifier comprises a JavaScript variable. If, on the other hand, the request does contain an identifier, the method branches to step 212 and logs the identifier and the web page in the log file. Step 214 associates the identifier with the requested web page. This step can be performed in any suitable way. For example, the identifier can be embedded in the web page. The embedded identifier may or may not be visible. In at least some embodiments, the identifier comprises a JavaScript variable. Step 216 then returns the web page with the identifier to the requester.

Step 218 receives a web page with the identifier. Step 220 uses the identifier in subsequent web page requests from the same tab. Step 222 does not use the identifier in web page requests from other tabs. By doing so, the server will be able to determine from which tab a particular request originated and hence, will be able to track navigation flows associated with individual tabs. If a user changes tabs, then the method would repeat, as described above, with a new, different identifier being generated and associated with subsequently requested web pages from within the new tab.

Having described the notion of tracking navigation activities at the granularity of each tab, consider now an implementation example that provides a specific approach to tracking tab-related navigation.

Implementation Example

In the example about to be described, navigation activities associated with a tab can be tracked within a particular domain. Typically, a browser session cookie is utilized to correlate all of the requests for web pages on a particular site or domain. In this specific implementation example, a globally unique Experience ID is utilized during the first request from a browser session. The Experience ID is set as a session cookie, and read on subsequent requests made to the server. In addition, this implementation example utilizes a Flow ID, which is unique within the context of the associated Experience ID, to enable navigation to be tracked at the granularity of a tab. As an overview of this process, consider the following.

A single flow can be thought of as a sequence of pages within a particular suite that is viewed under the same tab and connected through "normal" left mouse clicks on links that are displayed on a web page. If the user leaves the suite and returns under the same tab, the old flow would have been interrupted and the new flow will begin when the user returns to the tab. If the user enters an address correctly in the address bar of the same tab, such also constitutes a new flow.

In the illustrated and described embodiment, the Flow ID is propagated by the server responsive to receiving a web page request from the client. The Flow ID can be printed on the web page as a JavaScript variable. Specific handlers on the client side can look for certain events, such as clicking on a link, and propagate the Flow ID back to the server for processing. For example, if a user executes a left mouse click or any other click which would display a page in the same tab and within the destination URL within the current suite, the Flow ID that was printed on the web page can be propagated back to the server via a query string parameter or a cookie.

On the server side, the web page request is examined for the presence of the Flow ID. If the Flow ID is contained in the request, the server continues to use the current Flow ID by associating the current request with that Flow ID in a log file. In addition, the Flow ID is associated with the requested web page and returned to the client. If, on the other hand, there was no Flow ID in the request, a new Flow ID is generated randomly and associated with the currently-requested web page. In addition, the new Flow ID and its associated web page are logged into a log file and the new web page with the new Flow ID is returned to the client.

Having described a general overview of this implementation example, consider now individual processes that take place first on the server side, and then on the client side. This is followed by an example that illustrates how navigation activities can be tracked in accordance with one more embodiments.

Server Side Processes

On the server side, when a web page request is received, the request is examined for the presence of an Experience ID cookie. If the request contains the Experience ID cookie, the associated Experience ID is used for the session. If the Experience ID cookie is not in the request, a new Experience ID is created and saved to the Experience ID cookie. Next, the server checks for the presence of a Flow ID cookie in the request. If the Flow ID cookie is in the request, the current Flow ID becomes whatever Flow ID is described in the Flow ID cookie. The cookie is then cleared. If the Flow ID cookie is not in the request, a new Flow ID is selected. Next, the server logs the current web page request with the current Experience ID and Flow ID to a log file. Additionally, the current Flow ID is printed as a JavaScript variable on the web page. The web page is then subsequently returned to the client.

Client Side Processes

On the client side, a number of different handlers are used and attached to various events that can occur on the web page. These events include, by way of example and not limitation, onclick, onmousedown, onmouseup, onkeydown, onkeyup, ontouchstart, and ontouchend.

When an event occurs, the handler checks to ascertain which element on the web page is associated with the event. If the element on which the event occurred is a link element, then the handler checks the target URL. If the target URL is associated with the domain of interest, the handler checks to ascertain the type of user input, e.g. click, that occurred. If the user input is of the type that would open a new web page in the same tab, then the Flow ID cookie is set to the value of the Flow ID Javascript variable that was printed on the web page and used in the new web page request.

Tracking Navigation Activities—Example

Figure 3:
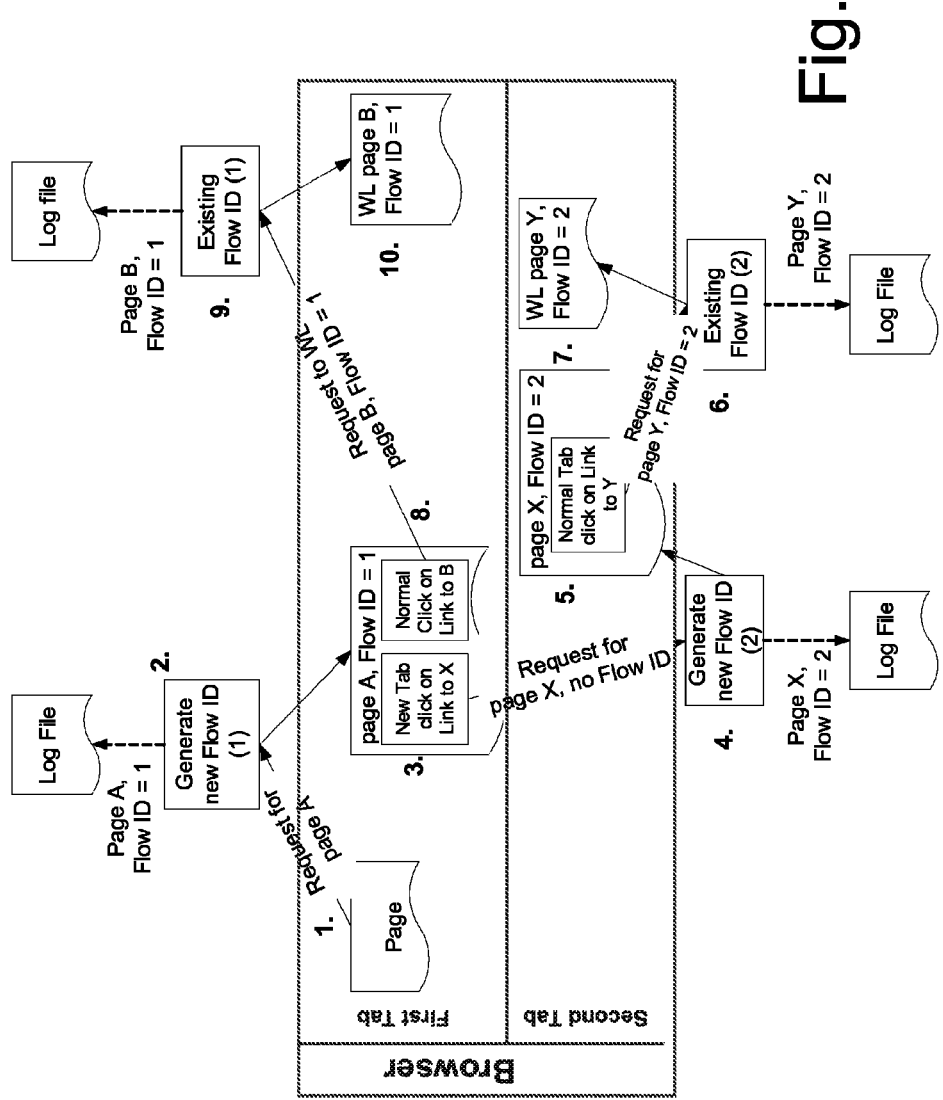
FIG. 3 is a diagrammatic representation of a data flow in accordance with one or more embodiments.

FIG. 3 is a diagram that illustrates an example of how navigation activities can be tracked at the granularity of a tab. In this example, there is a diagrammatic representation of a web browser that includes first and second tabs. Activities that are depicted inside the diagrammatic representation of the Web browser are considered to occur in the Web browser. Activities that are depicted outside of the diagrammatic representation of the Web browser are considered to occur on the server. In addition, each of the activities described below is enumerated, e.g., "1", "2", and so on. This is to assist the reader in following the description just below.

At item 1, the user opens the browser and, in the first tab, enters the address of a web page (page A) associated with a domain of interest. A web page request is then sent to the server for page A. Since this is the first request from a new tab, there is no Flow ID to associate with the request.

At the item 2, on the server side, the web page request is received. Because no Flow ID is found in the request, a new Flow ID is generated, e.g. "1". An entry is made in the log file for this browser session indicating that a request for page A occurred and that the Flow ID was "1". Page A is prepared with a JavaScript variable Flow ID=1 and transmitted to the client.

At item 3, page A is rendered by the browser in the original first tab. Assume now that on page A user right clicks on a link to page X and selects "Open in new tab" from the drop-down menu. This event is caught by one of the handlers and is ascertained to be a click other than one that would navigate to page within the present tab. Because of this, when the web page request is sent to the server, no Flow ID is included.

At item 4, on the server side, the web page request for page X is received without a Flow ID. The server randomly generates a new Flow ID, e.g., "2," and an entry about this request is logged in the log file. The log file entry associates the page X and flow ID=2. Page X is prepared with a JavaScript variable Flow ID=2 and transmitted to the client.

At item 5, on the client side, page X is rendered in the second tab by the Web browser. Assume now that on page X, the user left clicks (a normal page navigation click) on a link to page Y. Because this was a normal page navigation click within the tab, and because page Y is in the domain of interest, before the web page request is sent to the server, a Flow ID cookie is written with a value of "2".

At item 6, the server receives the request for page Y including the Flow ID of 2. Because the cookie is contained in the request, the server uses the Flow ID of 2 for this request, erases the Flow ID cookie, and logs the request for page Y together with the Flow ID in the log file. In addition, the server prepares page Y for transmission to the client by including the Flow ID variable set to "2" on the web page.

At item 7, the new web page Y is rendered by the browser in the second tab.

At item 8, assume now that the user returns to the first tab. Here, page A is still open. Assume now that the user left clicks on a link to page B. This event is caught and ascertained to be a normal navigation within the tab to a page that is located in the domain of interest. Accordingly, a web page request is prepared requesting page B. In the web page request, the Flow ID cookie is set to equal "1."

At item 9, on the server side, the request for page B is received with the Flow ID of "1." Since the Flow ID is in the request, an entry is written to the log file that associates page B and the Flow ID of "1."

At item 10, the server returns page B to the client with a Flow ID of "1." The page can now be rendered in the first tab.

In this example, the log file that is prepared by the server would have the following form:

| | |
|---|---|
| Page A | Flow ID = 1 |
| Page X | Flow ID = 2 |
| Page Y | Flow ID = 2 |
| Page B | Flow ID = 1 |

Notice here that because of the use of Flow IDs, individual navigation flows associated with individual tabs can be tracked. If this were not the case, then there would be no way to ascertain that the navigation between the different pages occurred on different tabs. Rather, all of the navigation events would simply be associated with the browser session and not with individual tabs of the browser. By doing this, more detailed analysis about a user's navigation flow can be conducted.

Figure 4:
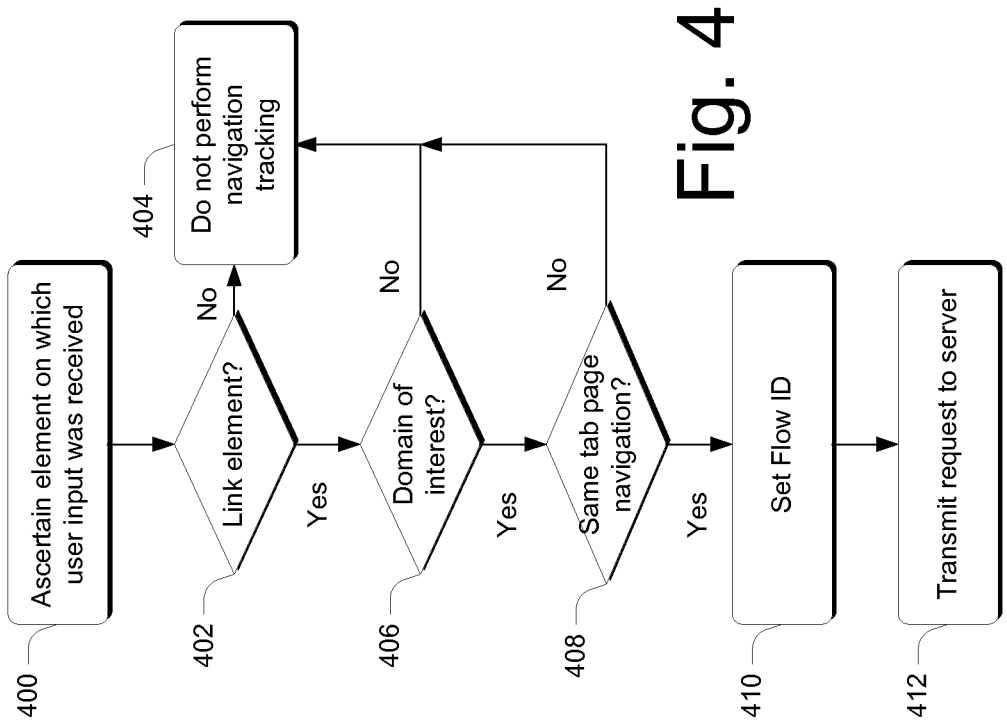
FIG. 4 is a flow diagram that describes steps a method in accordance with one or more embodiments.

FIG. 4 is a flow diagram that describes steps in a client-side method in accordance with one or more embodiments. This description assumes that a Flow ID for an individual tab has already been received from the server as described above. The method can be performed in connection with any suitable hardware, software, firmware, or combination thereof. In at least some embodiments, the method can be performed by a software module in the form of a client-side navigation tracking module, such as navigation tracking module 111 in FIG. 1.

Step 400 ascertains an element on a web page on which user input was received. If, at step 402, the element is determined to be an element other than a link element, step 404 does not perform navigation tracking. On the other hand, if the element is determined to be a link element, then step 406 ascertains whether an associated navigation occurs within a domain of interest. If not, the method branches to step 404. If, on the other hand, the navigation occurs within a domain of interest, step 408 ascertains whether the navigation is a page navigation that occurs within the same tab. If not, the method branches to step 404 and does not perform navigation tracking for that particular tab. For example, if the navigation were to cause a new tab to be opened with the navigated page rendered therein, the method would branch to step 404 for the first tab. However, navigation tracking can be performed for the new tab. If, on the other hand, the navigation is a same-tab, page navigation, step 410 sets a Flow ID. Any suitable technique can be used for setting the Flow ID. Next, a web page request that includes the Flow ID is transmitted to a Web server.

Figure 5:
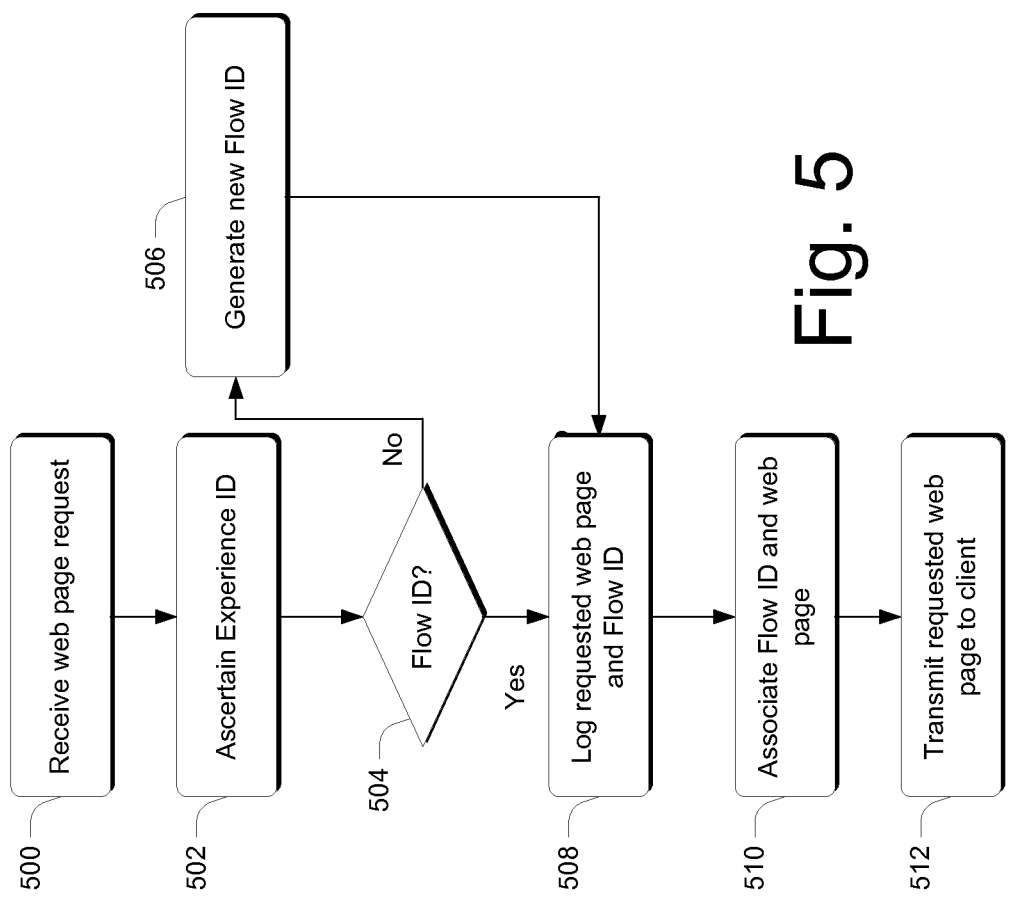
FIG. 5 is a flow diagram that describes steps a method in accordance with one or more embodiments.

FIG. 5 is a flow diagram that describes steps in a server-side method in accordance with one or more embodiments. The method can be performed in connection with any suitable hardware, software, firmware, or combination thereof. In at least some embodiments, the method can be performed by a software module in the form of a server-side navigation tracking module, such as navigation tracking module 122 in FIG. 1.

Step 500 receives a web page request from a client. Step 502 ascertains an Experience ID associated with the web page request. This can be done in any suitable way. For example, an Experience ID can be included in a cookie associated with the request. Alternately, an Experience ID might not be included with the request. Rather, an Experience ID might be generated by the server for a new session. Step 504 ascertains whether a Flow ID is associated with the web page request. If not, step 506 generates a new Flow ID for the request. If a Flow ID is associated with the web page request or, a new one is generated at step 506, step 508 makes a log entry of the requested web page and the Flow ID.

Step 510 associates the Flow ID and the requested web page. The step can be performed in any suitable way. For example, in at least some embodiments, the Flow ID can be incorporated into the requested web page as a JavaScript variable as described above. Alternately or additionally, the Flow ID might be represented as a property or characteristic of the web page. Step 512 transmits the requested web page, including the Flow ID, to the client.

Having described various navigation tracking embodiments, consider now an example system that can be utilized to implement one or more of the above-described embodiments.

Example System

Figure 6:
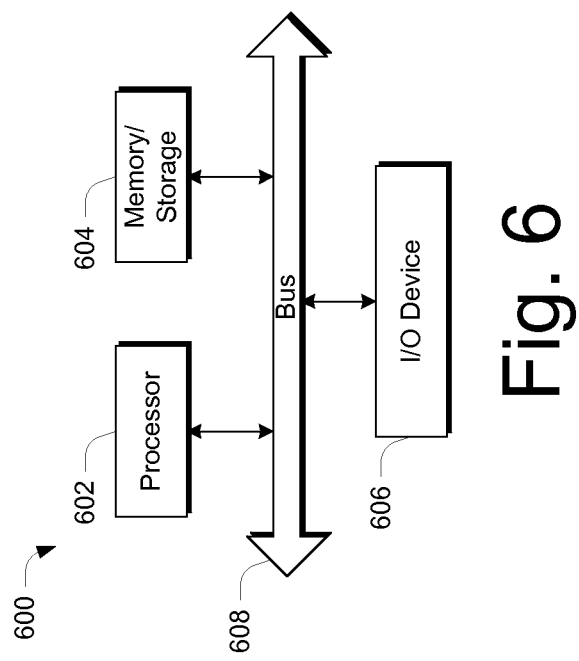
FIG. 6 illustrates an example system that can be used to implement one or more embodiments.

FIG. 6 illustrates an example computing device 600 that can be used to implement the various embodiments described above. Computing device 600 can be, for example, computing device 102 or server 114 of FIG. 1 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments enable navigation flows that occur within a single tab to be tracked. Client-side and server-side software work in concert to utilize identifiers that are used to track navigation within a particular tab.

In at least some embodiments, a client can request a web page from within a tab and, responsive to that request, a server can create an identifier and associate the identifier with the web page. The web page and identifier can then be returned to the client. Subsequent web page requests from within the tab include the identifier so that the server knows that the request came from the same tab. If a user opens a new tab and makes a web page request, the client-side browser will not include the identifier associated with the other tab. Rather, no identifier will be included in the web page request and, responsively, the server will issue a new identifier so that navigation activities associated with the new tab can be tracked as well.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving a web page navigation indication comprising a request for a web page from within a web application's first tab;

ascertaining the web page navigation indication is not directed to navigation within the first tab;

sending the request to a server that provides the web page, the request not including an identifier directed to tab-specific navigation tracking;

responsive to sending the request, receiving from the server the web page including an identifier directed to tab-specific navigation tracking in a shared session of the web application from within an additional tab that is unique within the context of an associated session cookie, the session cookie shared with the first tab;

using the received identifier from the server in subsequent web page requests from within the additional tab; and not using the received identifier in web page requests from other tabs.

2. The method of claim 1, wherein the received identifier comprises a JavaScript variable.

3. The method of claim 1, wherein said using and not using are performed by a navigation tracking module that is implemented as part of the web-application.

4. The method of claim 1, wherein said using the received identifier comprises including the received identifier with a query string in the subsequent web page requests.

5. The method of claim 1, wherein said using the received identifier comprises including the received identifier with a cookie that is sent along with the subsequent web page requests.

6. The method of claim 1, wherein said using the received identifier comprises using the received identifier if a requested web page is within a domain of interest.

7. A computer-implemented method comprising:
receiving, at a server, a request for web content;
ascertaining whether a tab-specific identifier, associated with an individual tab on a requesting web-application within the context of an associated session cookie, is associated with the request;
responsive to the request for the web content not containing the tab-specific identifier, generating, at the server, a new tab-specific identifier and logging the new tab-specific identifier and the associated web content in a log file, the new tab-specific identifier configured to share the session cookie with the tab-specific identifier;
responsive to the request for the web content containing the identifier, logging the tab-specific identifier and the associated web content in the log file located at the server;
associating either the tab-specific identifier or the new tab-specific identifier with the web content; and
returning the web page content including either the tab-specific identifier or the new tab-specific identifier to a client from which the request was received.

8. The method of claim 7, wherein the ascertaining is performed by ascertaining whether the tab-specific identifier is associated with a query string that forms part of the request.

9. The method of claim 7, wherein the ascertaining is performed by ascertaining whether the tab-specific identifier is associated with a cookie that is received along with the request.

10. The method of claim 7, wherein the generating a new tab-specific identifier is performed by generating a JavaScript variable.

11. The method of claim 7, wherein the web content request is a web page request.

12. The method of claim 7, wherein the web application is a web browser.

13. A system comprising:
one or more computing devices having one or more navigation tracking modules at least partially implemented in hardware configured to implement a method comprising:
ascertaining an Experience ID associated with the web content request;
ascertaining whether a Flow ID is associated with the web content request, the Flow ID allowing web navigation to be tracked at the granularity of a tab;
if no Flow ID is associated with the web content request, generating a new Flow ID for the web content request and making a log entry of the Experience ID, the requested web content, and the new Flow ID, the Experience ID configured to support multiple Flow IDs;
if a Flow ID is associated with the web content request, making a log entry of at least the requested web content and the Flow ID;
associating either the new Flow ID or the Flow ID with the requested web content; and
transmitting the requested web content including either the new Flow ID or the Flow ID to a client.

14. The system of claim 13, wherein said associating either the new Flow ID or the Flow ID is performed by incorporating into the requested web content a JavaScript variable.

15. The system of claim 13, wherein said ascertaining whether a Flow ID is associated with the web content request is performed by ascertaining whether the Flow ID is associated with a query string that forms part of the web content request.

16. The system of claim 13, wherein said ascertaining whether a Flow ID is associated with the web content request is performed by ascertaining whether the Flow ID is associated with a cookie that is received along with the web content request.

17. The system of claim 13, wherein the web content request is a web page request.

18. The system of claim 13, wherein the web application is a web browser.

19. The system of claim 13, further comprising ascertaining the web page navigation indication from within the web application's first tab is not directed to navigation within the first tab.

20. The system of claim 13, further comprising ascertaining the web page navigation indication is directed to a link element.

* * * * *